US012623909B2

(12) United States Patent
    Zones

(10) Patent No.: US 12,623,909 B2
(45) Date of Patent: May 12, 2026

(54) MOLECULAR SIEVE SSZ-121 WITH HIGH ACIDITY, ITS SYNTHESIS AND USE

(71) Applicant: Chevron U.S.A. Inc., San Ramon, CA (US)

(72) Inventor: Stacey I. Zones, San Francisco, CA (US)

(73) Assignee: Chevron U.S.A. Inc.

( * ) Notice: Subject to any disclaimer, the term of this patent is extended or adjusted under 35 U.S.C. 154(b) by 464 days.

(21) Appl. No.: 18/325,404

(22) Filed: May 30, 2023

(65) Prior Publication Data

US 2023/0382746 A1     Nov. 30, 2023

Related U.S. Application Data

(60) Provisional application No. 63/365,527, filed on May 31, 2022.

(51) Int. Cl.
    *C01B 33/26* (2006.01)
    *B01J 29/08* (2006.01)
    *B01J 37/08* (2006.01)
    *C10G 35/095* (2006.01)

(52) U.S. Cl.
    CPC .......... *C01B 33/2853* (2013.01); *B01J 29/084* (2013.01); *B01J 37/08* (2013.01); *C10G 35/095* (2013.01); *C01P 2002/72* (2013.01); *C10G 2300/70* (2013.01)

(58) Field of Classification Search
    CPC ..... C01B 33/2853; B01J 29/084; B01J 37/08; C10G 35/095
    See application file for complete search history.

(56) References Cited

U.S. PATENT DOCUMENTS

| | | |
|---|---|---|
| 11,161,750 B1 | 11/2021 | Zones |
| 2005/0194289 A1 | 9/2005 | Overbeek et al. |
| 2006/0115417 A1 | 6/2006 | Yuen et al. |
| 2008/0058196 A1 | 3/2008 | Zones et al. |
| 2011/0318263 A1 | 12/2011 | Zones et al. |
| 2015/0011787 A1 | 1/2015 | Bellussi et al. |
| 2017/0128923 A1 | 5/2017 | Yang et al. |
| 2019/0256364 A1 | 8/2019 | Zones et al. |
| 2019/0375648 A1 | 12/2019 | Xie et al. |
| 2021/0221696 A1 | 7/2021 | Zones et al. |
| 2022/0072520 A1 | 3/2022 | Zones et al. |

FOREIGN PATENT DOCUMENTS

| | | |
|---|---|---|
| CN | 113343948 A | 9/2021 |
| WO | 2021082140 A1 | 5/2021 |

OTHER PUBLICATIONS

Chen, Reforming with novel bororsilicate molecular sieve catalyst, 1997, Mat. Res. Soc. Symp. Proc, 454, 205-215.*
International Search Report and Written Opinion from PCT/US2023/067606 mailed Sep. 29, 2023.

* cited by examiner

*Primary Examiner* — James A Fiorito
(74) *Attorney, Agent, or Firm* — Erich Joseph Gess; Melissa M. Hayworth; Terrence Michael Flaherty

(57) ABSTRACT

A novel synthetic crystalline aluminogermanosilicate molecular sieve material, designated SSZ-121 is provided which exhibits increased acidity. The SSZ-121 can be synthesized using 1,3-bis(1-adamantyl)imidazolium cations as a structure directing agent. The synthesis employs a boron pathway to achieve increased acid sites. The SSZ-121 of increased acidity may be used in organic compound conversion reactions and/or sorptive processes.

9 Claims, No Drawings

1

MOLECULAR SIEVE SSZ-121 WITH HIGH ACIDITY, ITS SYNTHESIS AND USE

CROSS REFERENCE TO RELATED APPLICATIONS

The present application claims priority to U.S. Provisional Application No. 63/365,527, filed May 31, 2022, the complete disclosure of which is incorporated herein by reference in its entirety.

FIELD

This disclosure relates to a novel synthetic crystalline aluminogermanosilicate molecular sieve designated SSZ-121 having increased acidity, and its synthesis.

Zeolitic materials are known to have utility as sorbents and to have catalytic properties for various types of organic compound conversion reactions. Certain zeolitic materials are ordered, porous crystalline materials having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for sorption molecules of certain dimensions while rejecting those of larger dimensions, these materials have come to be known as "molecular sieves" and are utilized in a variety of ways to take advantage of these properties.

There are currently over 250 known zeolitic framework structures recognized by the International Zeolite Association. There exists a need for new structures, having different properties than those of known materials, for improving the performance of many organic compound conversion and sorption processes. Each structure has unique pore, channel and cage dimensions, which gives its particular properties as described above. Each framework structure also has a particular composition. Improvements in preparing more pure, single phase materials are always important. Providing molecular sieves with increased acid sites can be valuable with regard to the catalysis in organic compound conversion reactions.

SUMMARY

According to the present disclosure, a new crystalline aluminogermanosilicate molecular sieve, designated SSZ-121, with increased acid sites, and having a unique composition, has been synthesized using 1,3-bis(1-adamantyl)imidazolium cations as a structure directing agent. The synthesis is conducted through a boron pathway.

The present SSZ-121 molecular sieve contains some boron in its framework. In one embodiment, the amount of boron can range from 50-250 ppm.

The present aluminogermanosilicate SSZ-121 molecular sieve having increased acid sites and hence enhanced acidity, can have a chemical composition comprising the following molar relationship:

TABLE 1

| | Broadest | Secondary |
|---|---|---|
| $(SiO_2 + GeO_2)/Al_2O_3$ | $\geq 30$ | $\geq 50$ |

2

The SSZ-121 zeolite prepared also has increased acid sites and some boron in the framework.

In one embodiment, there is provided a method of synthesizing the present SSZ-121 aluminogermanosilicate molecular sieve, the method comprising (1) providing a reaction mixture comprising: (a) a FAU framework type zeolite; (b) a source of germanium; (c) a source of boron; (d) a structure directing agent (Q) comprising 1,3-bis(1-adamantyl) imidazolium cations; (e) a source of fluoride ions; and (f) water; (2) subjecting the reaction mixture to crystallization conditions sufficient to form crystals of a boron germanosilicate molecular sieve; (3) removing structure directing agent (Q); and (4) treating the remaining crystals to replace boron in the framework with aluminum.

Thus, the boron pathway involves preparing a germanosilicate molecular sieve comprising boron in the framework. The boron molecular sieve has in its as-synthesized form, a powder X-ray diffraction pattern including at least the following 2-theta scattering angles: $6.3\pm0.2$; $7.0\pm0.2$; $9.5\pm0.2$; $13.0\pm0.2$; $16.0\pm0.2$; $18.5\pm0.2$; $19.8\pm0.2$; $21.2\pm0.2$; $24.0\pm0.2$; $25.0\pm0.2$; $26.5\pm0.2$; $28.5\pm0.2$; and $30.0\pm0.2$ degrees 2-theta.

It is this boron germanosilicate molecular sieve that is then treated to replace the boron in the framework with aluminum, hence resulting in increased acid sites.

In another embodiment, there is provided a process of converting a feedstock comprising an organic compound to a conversion product which comprises contacting the feedstock at organic compound conversion conditions with a catalyst comprising an active form of the aluminogermanosilicate molecular sieve, described herein.

Among other factors, the present process allows one to obtain a SSZ-121 molecular sieve with increased acid sites, i.e., the SSZ-121 is acid rich or of enhanced acidity. By increased acid sites is meant that by using the present process with its boron pathway, a SSZ-121 molecular sieve can be obtained with more acid sites than would be possible by preparing the molecular sieve conventionally in a straight forward method with aluminum sites and no boron. When the conventional route is employed, it has been found that some amorphous phase occurs so a loss of Al acid sites is experienced. It has been found, quite surprisingly, that by first inserting boron in the framework, and then replacing the boron with aluminum, a molecular sieve having a comparatively enhanced amount of acid sites can be achieved. Thus, the SSZ-121 is acid rich or of enhanced acidity. The increased acid sites can result in improved catalytic characteristics for the present SSZ-121 molecular sieve. The present SSZ-121 molecular sieve also contains a minimal amount of boron.

DETAILED DESCRIPTION

Definitions

The term "framework type" has the meaning described in the "Atlas of Zeolite Framework Types" by Ch. Baerlocher, L. B. McCusker and D. H. Olsen (Elsevier, Sixth Revised Edition, 2007).

The term "zeolite" refers a synthetic aluminosilicate molecular sieve having a framework constructed of alumina and silica (i.e., repeating $AlO_4$ and $SiO_4$ tetrahedral units).

The term "aluminogermanosilicate" refers to a molecular sieve having a framework constructed of $AlO_4$, $GeO_4$ and $SiO_4$ tetrahedral units. The aluminogermanosilicate may contain only the named oxides, in which case, it may be described as a "pure aluminogermanosilicate" or it may contain other oxides as well.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

By "increased," or "more," acid sites is meant that the SSZ-121 molecular sieve prepared by the present process comprises more acid sites than would be possible by preparing the molecular sieve conventionally, without employing the present boron pathway.

When the conventional, straight forward method with aluminum is employed, it has been discovered that an amorphous phase occurs which causes a loss of Al acid sites. It has been found, quite surprisingly, that by first inserting boron in the SSZ-121 framework, and then replacing the boron with aluminum, a SSZ-121 molecular sieve having more aluminum acid sites, i.e., a comparatively greater amount of acid sites, can be obtained than would be obtained if the boron were not introduced in the initial preparation of the molecular sieve. Thus, the SSZ-121 is acid rich or of enhanced acidity. This increased acidity can impact, improve, the catalytic characteristics of the molecular sieve. The molecular sieve would be quite useful, e.g., in converting a feedstock comprising an organic compound to a conversion product. Due to the boron pathway, some boron does remain in the SSZ-121 molecular sieve.

Synthesis of the Molecular Sieve

The present molecular sieve SSZ-121 can be synthesized through a boron pathway by a method comprising: (1) preparing a reaction mixture comprising (a) a FAU framework type zeolite; (b) a source of germanium; (c) a source of boron; (d) a structure directing agent comprising 1,3-bis (1-adamantyl)imidazolium cations (Q); (e) a source of fluoride ions; and (f) water; (2) subjecting the reaction mixture to crystallization conditions sufficient to form crystals of a boron SSZ-121 molecular sieve. The boron containing SSZ-121 molecular sieve is then treated to remove the SDA, followed by a treatment to replace some or all of the boron with aluminum. The result is a SSZ-121 with increased acid sites.

The reaction mixture can have a composition, in terms of molar ratios, within the ranges set forth in Table 2:

TABLE 2

| Reactants | Broadest | Secondary |
|---|---|---|
| $(SiO_2 + GeO_2)/B_2O_3$ | $\geq 10$ | $\geq 15$ |
| $Q/(SiO_2 + GeO_2)$ | 0.10 to 1.00 | 0.20 to 0.70 |
| $F/(SiO_2 + GeO_2)$ | 0.10 to 1.00 | 0.20 to 0.70 |
| $H_2O/(SiO_2 + GeO_2)$ | 2 to 10 | 4 to 8 |
| $SiO_2/GeO_2$ | 4 to 12 | 6 to 10 | wherein Q comprises 1,3-bis(1-adamantyl)imidazolium cations.

Suitable sources of silicon oxide can include any suitable known source such as colloidal silica, fumed silica, precipitated silica, or alkali metal silicates. A FAU framework type zeolite, e.g., zeolite Y, can also be a source of silicon oxide. In such a case, the FAU framework type zeolite has a very high $SiO_2/Al_2O_3$ molar ratio of at least 250, and preferably at least 300 (e.g., 300 to 500). The FAU framework type zeolite can comprise two or more FAU framework type zeolites having different $SiO_2/Al_2O_3$ molar ratios. The FAU framework type zeolite can be zeolite Y, or any of its various post-synthetic modified forms, as is known in the art.

Suitable sources of germanium include germanium oxide and germanium alkoxides (e.g., germanium ethoxide, germanium isopropoxide).

Silicon and germanium may be present in the reaction mixture in a $SiO_2/GeO_2$ molar ratio of from 4 to 12 (e.g., 6 to 10).

Suitable sources of boron can include boric acid, which is preferred.

Suitable sources of fluoride ions include hydrogen fluoride, ammonium fluoride and ammonium bifluoride.

The structure directing agent comprises 1,3-bis(1-adamantyl)imidazolium cations (Q), represented by the following structure (1):

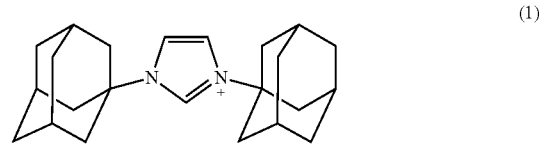

(1)

Suitable sources of Q are the hydroxides, chlorides, bromides, and/or other salts of the quaternary ammonium compound, as well as mixtures thereof.

The reaction mixture can have a Q/F molar ratio in a range of from 0.80 to 1.20 (e.g., 0.85 to 1.15, 0.90 to 1.10, 0.95 to 1.05, or 1 to 1).

The reaction mixture can contain seeds of a molecular sieve material, such as boron SSZ-121 from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of boron SSZ-121 over any undesired phases.

It is noted that the reaction mixture components can be supplied by more than one source. Also, two or more reaction components can be provided by one source. The reaction mixture can be prepared either batchwise or continuously.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Consistent with the boron pathway, crystallization of the boron SSZ-121 molecular sieve from the above reaction mixture can be carried out under either static, tumbled or stirred conditions in a suitable reactor vessel (e.g., a polypropylene jar or a Teflon-lined or stainless-steel autoclave) at a temperature of from 100° C. to 200° C. (e.g., 150° C. to 175° C.) for a time sufficient for crystallization to occur at the temperature used (e.g., 1 day to 14 days, or 2 days to 10 days). The hydrothermal crystallization process is typically conducted under pressure, such as in an autoclave, and is preferably under autogenous pressure.

Once the boron molecular sieve crystals have formed, the solid product can be recovered from the reaction mixture by standard mechanical separation techniques such as centrifugation or filtration. The recovered crystals are water-washed and then dried to obtain the as-synthesized boron SSZ-121 molecular sieve crystals. The drying step can be performed at an elevated temperature (e.g., 75° C. to 150° C.) for several hours (e.g., about 4 to 24 hours). The drying step can be performed under vacuum or at atmospheric pressure.

As a result of the crystallization process, the recovered crystalline molecular sieve product contains within its pore structure at least a portion of the structure directing agent used in the synthesis.

The as-synthesized molecular sieve may also be subjected to treatment to remove part or all of the structure directing agent used in its synthesis. This is conveniently effected by thermal treatment (i.e., calcination) in which the as-synthesized material is heated at a temperature of at least about 370° C. for at least 1 minute and generally not longer than 20 hours. While sub-atmospheric pressure can be employed for the thermal treatment, atmospheric pressure is desired for reasons of convenience. The thermal treatment can be performed at a temperature up to about 925° C. The thermal treatment may be carried out in an atmosphere selected from air, nitrogen or mixture thereof. For example, the thermal treatment may be conducted at a temperature of from 400° C. to 600° C. in air for a time period of from 3 to 8 hours. Alternatively, the structure directing agent Q can be removed by treatment with ozone. The ozone treatment may include heating the as-synthesized molecular sieve in the presence of ozone, such heating may be at a temperature of from 50° C. to 350° C. (e.g., from 100° C. to 300° C., or from 125° C. to 250° C.). In one embodiment, a treatment with ozone is preferred in that it can provide a higher micropore volume.

The molecular sieve crystals can then be treated to replace at least some of the boron, although preferably most (90%) if not all of the boron, with aluminum. In one embodiment, the amount of boron remaining after the exchange can be an amount ranging from 50 to 250 ppm. Conventional techniques can be used, e.g., by ion exchange. However, treating the molecular sieve with aqueous aluminum nitrate is a preferred manner of replacing the boron in the framework with aluminum. The treatment can be accomplished by contacting the molecular sieve with an aluminum nitrate solution under reflux.

Characterization of the Molecular Sieve

The acid enhanced molecular sieve SSZ-121, also containing some remaining boron, can have a chemical composition comprising the following molar relationship set forth in Table 1:

TABLE 1

|  | Broadest | Secondary |
| --- | --- | --- |
| $(SiO_2 + GeO_2)/Al_2O_3$ | ≥30 | ≥50 |

In some aspects, the molecular sieve can have a $SiO_2/GeO_2$ molar ratio in a range of from 4 to 12 (e.g., from 6 to 10).

In another aspect, molecular sieve SSZ-121 with an enhanced number of acid sites can have a chemical composition comprising the following molar relationship:

$$Al_2O_3:(n)(SiO_2+GeO_2)$$

wherein n is ≥30 (e.g., 30 to 500, 30 to 250, 30 to 150, ≥50, 50 to 250, or 50 to 150).

The acid enhanced molecular sieve SSZ-121 exhibits a powder XRD pattern with at least the following 2-theta scattering angles: 6.5±0.2, 9.5±0.2, 13.0 0.2, 18.5±0.2, 19.8±0.2, 21.2±0.2, 24.0 0.2, 25.0 0.2, 26.5±0.2, 28.5±0.2 and 30.0±0.2 degrees 2-theta.

The powder X-ray diffraction patterns presented herein can be collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

INDUSTRIAL APPLICABILITY

The acid site enhanced molecular sieve SSZ-121 (where part or all of the structure directing agent is removed) may be used as a sorbent or as a catalyst to catalyze a wide variety of organic compound conversion processes including many of present commercial/industrial importance. Examples of chemical conversion processes which are effectively catalyzed by the acid rich SSZ-121, by itself or in combination with one or more other catalytically active substances including other crystalline catalysts, including those requiring a catalyst with acid activity, and a catalytic metal. Examples of organic conversion processes which may be catalyzed by the present SSZ-121 with increased acid sites include aromatization, cracking, hydrocracking, disproportionation, alkylation, oligomerization, and isomerization.

As in the case of many catalysts, it may be desirable to incorporate the acid site rich SSZ-121 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with the acid rich SSZ-121 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the present acid site rich SSZ-121 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with acid rich SSZ-121 also include inorganic oxides, such as silica, zirconia, titania, magnesia, beryllia, alumina, and mixtures thereof.

In addition to the foregoing materials, the present acid rich SSZ-121 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of acid site rich SSZ-121 and inorganic oxide matrix may vary widely, with the SSZ-121 content ranging from 1 to 90 wt. % (e.g., 2 to 80 wt. %) of the composite.

EXAMPLES

The following illustrative examples are intended to be non-limiting.

Example 1

Synthesis of SSZ-121 Boron

Into a tared cup 42.5 grams of a solution of the SDA is added as OH, which is 0.28 Molar. Then into the solution is added (a) 1.20 grams of Tosoh HUA 390 FAU zeolite with SAR=500, (b) 0.225 grams of Germaniun dioxide (c) 0.06 grams of boric acid. Then the open tared cup is set to evaporate in a hood until the $H_2O/TO_2$ ratio comes down to 7. The reaction is then given HF in an amount equal to the amount of SDA in mmoles. Then the contents of the cup are moved into a 23 ml Teflon cup for a Parr stainless steel reactor which is closed and loaded onto a rotating spit (43 RPM) in a convection heated oven. The crystallization is carried out over about 15 days at 160° C. (it may be advantages to seed the zeolite synthesis using typically about 3 wt % of the Tosoh reagent used). The product is collected and washed 4 times, 50 ml $H_2O$ each aliquot.

The recovered product can then be treated to remove SDA, followed by treatment with an aluminum nitrate under reflux to provide SSZ-121 with increased acid sites.

Example 2

Calcination of SSZ-121 Boron

The as-synthesized boron molecular sieve of Example 1 can be calcined inside a muffle furnace under a flow of air heated to 550° C. at a rate of 1° C./minute and held at 550° C. for 5 hours, cooled and then analyzed by powder XRD.

Analysis of the calcined product by the t-plot method of nitrogen physisorption would show the sample had a micropore volume of at least 0.144 cm³/g.

Example 3

While one can calcine the Boron SSZ-121, it is preferred to first treat the zeolite with ozone at 150° C. to remove the SDA guest molecule. In addition, it was also found that much of the SDA could be first removed by a treatment with dimethylformide in a closed reactor at 150° C.; 1 gram of as-made zeolite and 7 ml dimethylformamide, heated static for 3-5 days.

The as-made B SSZ-121 can then be loaded into a cell to then have ozone passed through it while heated to 150° C. The treatment can be carried out for 16-20 hours. The mass loss (if not treated by dimethylformamide) is roughly 40%.

The XRD pattern will essentially be the same as the XRD pattern described previously.

Example 4

The porous B SSZ-121 from Example 3 can then be treated with a 0.2 molar solution of aluminum nitrate, 10 grams of solution per gram of zeolite by heating in a closed system to 95° C. for 5 days. The pH of the treatment solution will drop from about 2.5 to 1.55 which is consistent with Al cations having been removed from the solution and put into the zeolite. The recovered solids can be filtered and then washed with 25 cc 0.01 Normal HCl before any water washing. The acid wash first is to keep any aluminum cations in solution through the wash step such that Al is not deposited on the solids.

Example 5

Brønsted Acidity

Brønsted acidity of the molecular sieve of Example 4 can be determined by n-propylamine temperature-programmed desorption (TPD) adapted from the published descriptions by T. J. Gricus Kofke et al. (*J. Catal.* 1988, 114, 34-45); T. J. Gricus Kofke et al. (*J. Catal.* 1989, 115, 265-272); and J. G. Tittensor et al. (*J. Catal.* 1992, 138, 714-720). A sample can be pre-treated at 400° C.-500° C. for 1 hour in flowing dry $H_2$. The dehydrated sample is then cooled down to 120° C. in flowing dry helium and held at 120° C. for 30 minutes in a flowing helium saturated with n-propylamine for adsorption. The n-propylamine-saturated sample is then heated up to 500° C. at a rate of 10° C./minute in flowing dry helium. The Brønsted acidity is calculated based on the weight loss vs. temperature by thermogravimetric analysis (TGA) and effluent $NH_3$ and propene by mass spectrometry.

The desorption data for the peak near 400° C. can translate into a measured acidity of 160 micromoles per gram. This is sufficient to have Bronsted acid sites for catalysis.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

The invention claimed is:

1. A method of synthesizing a SSZ-121 molecular sieve having increased acid sites, the method comprising:
   (1) preparing a reaction mixture comprising:
      (a) a FAU framework type zeolite having a $SiO_2/Al_2O_3$ mol ratio of at least 300;
      (b) a source of germanium;
      (c) a source of boron;
      (d) a structure directing agent comprising 1,3-bis(1-adamantyl)imidazolium cations (Q);
      (e) a source of fluoride ions; and
      (f) water;
   (2) subjecting the reaction mixture to crystallization conditions sufficient to form crystals of a molecular sieve containing boron;
   (3) removing structure directing agent (Q); and
   (4) replacing some of the boron in the crystals of the molecular sieve with aluminum.

2. The method of claim 1, wherein the reaction mixture has a composition, in terms of molar ratios, as follows:

| $(SiO_2 + GeO_2)/B_2O_3$ | ≥10 |
|---|---|
| $Q/(SiO_2 + GeO_2)$ | 0.10 to 1.00 |
| $F/(SiO_2 + GeO_2)$ | 0.10 to 1.00 |
| $H_2O/(SiO_2 + GeO_2)$ | 2 to 10. |

3. The method of claim 1, wherein the reaction mixture has a composition, in terms of molar ratios, as follows:

| $(SiO_2 + GeO_2)/B_2O_3$ | 15 to 20 |
|---|---|
| $Q/(SiO_2 + GeO_2)$ | 0.20 to 0.70 |
| $F/(SiO_2 + GeO_2)$ | 0.20 to 0.70 |
| $H_2O/(SiO_2 + GeO_2)$ | 4 to 8. |

4. The method of claim 1, wherein the FAU framework type zeolite is zeolite Y.

5. The method of claim 1, wherein the crystallization conditions include a temperature of from 100° C. to 200° C.

6. The method of claim 1, wherein the reaction mixture has a molar ratio of Q/F in a range of from 0.8 to 1.2.

7. The process of claim 1, wherein the Q is removed by calcination.

8. The process of claim 1, wherein the Q is removed by treatment with ozone.

9. The process of claim 1, wherein the replacing of boron with aluminum comprises refluxing the molecular sieve crystals with a solution of aluminum nitrate.

* * * * *